3,370,170
ARTICLE AND METHOD FOR FORMING A THERMOGRAPHIC REPRODUCTION ON A SHEET OF POLYETHYLENE TEREPHTHALATE
Robert M. Gold, Brooklyn, N.Y., assignor to Keuffel & Esser Company, Hoboken, N.J., a corporation of New Jersey
No Drawing. Filed Oct. 2, 1964, Ser. No. 401,228
12 Claims. (Cl. 250—65)

The present invention relates to image formation, and refers more particularly to material and methods for image formation.

The present techniques for making photographic recordings using thermographic principles involve materials which remain heat-sensitive after the image is recorded and which produce degraded images when the recording materials is subsequently heated. Furthermore, present thermographic materials are not completely satisfactory for producing multi-colored images.

Therefore, one object of the present invention is to provide materials suitable for recording thermographic information which do not require fixing.

Another object is to provide methods of copying graphic information from any original containing infra-red absorbing graphics.

Other objects will become apparent in the course of the following specification.

The objects of the present invention may be achieved by applying a dye to polyethylene terephthalate, heating the polyethylene terephthalate imagewise to diffuse dye into the polyethylene terephthalate in the heated areas, and removing the excess dye to produce an image corresponding to the heat image in the polyethylene terephthalate film.

The following examples are given for purposes of illustration and are not intended to limit the scope of the present invention.

*Example 1*

A film of polyethylene terephthalate was coated with a solution of a dye such as 1% Oil Red O (C.I. 26125) in heptane. The solution was dried on the film. The solution may be coated on one or two sides. The dyed polyethylene terephthalate was then placed in heat-conductive relation to an original to be copied. Where the original was two sided, the polyethylene terephthalate film was placed in reflex position with regard to the infra-red radiation. Where the polyethylene terephthalate had been coated on one side only, it could be placed either with the dyed side in contact with the graphics of the original, or with the dyed side away from the image side of the original. This sandwich was then exposed to a high-intensity incandescent source such as that accomplished by passage through a thermal copying machine. After removal from the radiation source, the polyethylene terephthalate film was separated from the original copy and rinsed in a solvent for the dye. In the case at hand, the film was rinsed in heptane. It was then discovered that the dye rinsed off the entire sheet, except for the regions which had been heated by the conducted heat of the original.

In these regions, the dye had become affixed to the polyethylene terephthalate and could not be removed even by prolonged soaking in heptane.

*Example 2*

Although the process of Example 1 produced a legible copy of the original, it was found that the contrast of the image was greatly improved by the following technique. The polyethylene terephthalate film was first given a preliminary coating of trichloroacetic acid from a toluene solution. A five percent solution was found to be satisfactory.

The film was dried at a convenient temperature. However, it was found that the drying cycle greatly affected the appearance of the final image. Using a five-minute dwell time in the oven for drying, it was found that temperatures of 260° F. and higher resulted in a prepared film that gave better results in the reproduction process described above than a polyethylene terephthalate film which had not been treated with the trichloroacetic acid. Drying temperatures between 220° F. and 250° F. resulted in a film which reached much higher color-density values in the reproduction process. Drying temperatures between 160° F. and 210° F. resulted in still better contrast and density in the final reproduction copy. The preferred drying temperature was anywhere from room temperature up to 140° F. Practically, temperatures of 110° F. were found to be satisfactory.

The temperature region of 150° F. which may be described as the glass transition temperature, is the point at which the beneficial effects of the trichloroacetic acid treatment for the reproduction process tends to rapidly degrade. It seems reasonable that the trichloroacetic acid rapidly diffuses into the interior of the film or volatilizes out of the surface, both of which would deplete the surface of the trichloroacetic acid.

The trichloroacetic acid-treated polyethylene terephthalate was then used in a reproduction process of Example 1; that is, coated with a dye solution, allowed to dry, and exposed in heat-conductive relation with an original to an intense source of radiation.

Suitable dyes were relatively unlimited. For example, 1.5% Methyl Violet 2B was coated from water. A 5% solution in alcohol was also suitable. After exposure, the dye in the unheated background areas was removed by a water rinse.

Other suitable dyes were Brilliant Oil Blue BMA (C.I. Solvent Blue 16), Rhodamine B (C.I. 45170), Azosol Fast Red BE (C.I. 12715), Azo Oil Blue-Black B (C.I. Solvent Black 12), Oil Brown Y (C.I. Solvent Orange 30 and 31), Oil Yellow ENC (C.I. 11021), Aviation Oil Blue (C.I. Solvent Blue 58), and Latyl Violet BN (C.I. Disperse Violet 27).

Preferred solvents for dye application to the polyester film were heptane and water. A simple test to decide whether a particular dye solvent was suitable for coating the polyethylene terephthalate film was to dip the film in a test solution of dye and solvent, dry, and rinse in a solvent such as heptane or water. The suitability of the solvent for dyeing a film in this process was shown by the fact that a very satisfactory solvent left no residual stain on the polyethylene terephthalate. Some solvents diffused into the acid-treated film and left a residual stain which colored the backgrounds of any copies made therefrom.

The rinsing solvent was likewise chosen by a test similar to that described above. Normally, heptane or water was quite satisfactory and desirable. It removed the surface layer of the unheated dye, but did not leach out the dye from the heated image areas. To test a solvent for suitability as a rinsing solvent, a dye-coated film was thermographically exposed with a master and rinsed in this desired solvent. An unsatisfactory solvent removed the dye from the image areas. Another suitable test was to take an image already formed in a film, for example, an image of Oil Red O (C.I. 26125) which had been rinsed in heptane, and rub the image area with a piece of cotton soaked in a test solvent. Satisfactory solvents removed little or no dye from the image areas. Unsatisfactory solvents removed much or all of the dye.

It was quite obvious that the solvents could be used in suitable erasure or touch-up techniques. For example, an over-exposed background area in an Oil Red O image could be cleaned up by lightly wiping with a toluene-saturated piece of cotton. Erasures, likewise, could be handled with solvents which leached out the dye from the desired regions.

*Example 3*

Multicolored prints. The process of Examples 1 and 2 in no way affected the ability of the film to undergo treatment with a second dye treatment and exposure. For example, an acid-treated Oil Red O-coated film with a heat-absorbing original was exposed thermographically in a thermocopying machine and rinsed with heptane to obtain a red image of the master. This red image copy was then coated with a solution of Brilliant Oil Blue BMA in heptane and exposed in heat conductive relation with a second infrared absorbing master. After exposure, the film was rinsed in a bath of heptane. A blue image was obtained as if it had been exposed on clear polyethylene terephthalate film. The process may be repeated any desired number of times with the same or different colored dyes. The sensitivity of the polyethylene terephthalate was not diminished by the steps described above.

When multicolored prints were made, the selection of dyeing and rinsing solvents was more critical. It was preferable to employ solvents which did not diffuse into the trichloroacetic acid-treated polyethylene terephthalate. Otherwise, the trichloroacetic acid eventually leached out and resulted in loss of sensitivity.

The suitability of the solvents for this aspect of the treatment was determined in the following manner. The trichloroacetic acid-treated polyethylene terephthalate was dipped half way into a bath of test solvent for 15 to 120 seconds. The polyethylene terephthalate was removed and allowed to dry. The film was then coated with any dye found suitable in the description above, and a thermographic exposure was made. The dyed, exposed film was then rinsed in a suitable solvent such as heptane. When the test solvent was satisfactory, there was little or no difference evident in the portion of the sheet dipped in the solvent as compared to the other portion of the sheet. An unsuitable solvent was one which resulted in greatly diminished intensity of image in the region which had been rinsed in the solvent for 15 to 120 second period.

A suitable modification of the trichloroacetic acid treatment of the film utilized an acid-polymer treatment. The acid-polymer treated polyethylene terephthalate was utilized in the same manner as the trichloroacetic acid-treated polyethylene terephthalate. The polymers which could be added to the acid treating solution, included acrylic resin, gelatin, cellulose acetate, polyvinyl butyral, half second cellulose acetate-butyrate, polyvinyl chloride, poly-(methyl vinyl ether-mono benzyl maleate ester) alkyd resin, and melamine formaldehyde resin.

*Example 4*

In a modification of the above processes, an original, such as a silver halide diapositive or transparent positive, was coated with a dye, such as Oil Red O, using a solvent which did not affect the film. The dyed film was placed in contact with a thermoplastic layer such as the acid-treated polyethylene terephalate with the dyed silver halide emulsion in contact with the acid-tested surface. On passage through a thermographic machine, the heated silver areas caused diffusion of the dye into the polyethylene terephthalate film. Several excellent copies were obtained from the silver diapositive before it was necessary to redye the layer.

It is obvious that the multi-colored coatings can be produced in the same manner, that is, by using silver halide diapositives coated with different dyes, and sucessively exposing the trichloroacetic acid-treated polyethylene terephthalate.

*Example 5*

A process which is completely dry utilized a dye transfer layer which avoided the need for pre-dyeing the polyethylene terephthalate or rinsing the exposed print. For example, vinyl chloride-acetate resin Vinylite VYHH plasticized with polymeric ester Paraplex G-25 and containing a dye such as Oil Red O was cast into a film. This pliable, flexible film was used between the polyethylene terephthalate and the original subject matter. Other heat conductive relation may be used. Upon passing the three-layered sandwich through the thermographic machine to a temperature high enough to cause diffusion of the dye into the polyethylene terephthalate, a positive image of the original master was produced. The plasticized Vinylite VYHH film was easily stripped from both the original and the polyethylene terephthalate film.

In a similar manner, a layer of polyvinyl butyral containing a dye was also prepared and used. The polyvinyl butyral-dye also stripped quite readily from both the polyethylene terephthalate and the original copy.

When a transfer layer such as the polyvinyl butyral or plasticized polyvinyl chloride-acetate was employed for diffusion dyeing of the polyethylene terephthalate, the single sheet of transfer layer was usable many times as the dye was not depleted with one use. It was noted that these operations took place considerably below the melting point of any of the polymers involved, that is, the dyes were not transferred by melting, as was done with many thermographic dyed waxy layers, but the dye apparently diffused into the relatively cold polyethylene terephthalate or other thermoplastic involved in the solid state.

In a similar manner, cast films of plasticized cellulose acetate containing dyes such as Oil Brown Y were used as transfer layers.

It was noted that the techniques used for dyeing the polyethylene terephthalate layer were adaptable for use with other thermoplastic layers. In general, the temperature of the polyethylene terephthalate or other thermoplastic layer should be raised to at least the glass transition point to make dye diffusion quite rapid. It was quite probable that the presence of the trichloroacetic acid acted as a plasticizer, thus lowering the glass transition temperature or rendering the polyethylene terephthalate lower in viscosity at the glass point. Unsuitable solvents as described by tests above probably caused leaching out of the trichloroacetic acid, thus rendering its plasticizing effects less effective.

It is apparent that the described examples are capable of many variations and modifications. All such variations and modifications are to be included within the scope of the present invention.

What is claimed is:

1. A method of making a thermographic reproduction, which comprises the steps of:
   treating a polyethylene terephthalate support with an acid solution to improve the surface bonding properties of said support;
   drying the support to remove solvent from said support without removing acid from the surface thereof;
   providing a layer of diffusible dye in heat-conductive contact with said support;
   heating said support imagewise to diffuse dye into said support in areas corresponding to the heated image areas; and
   removing dye from the heated areas, thereby producing a dyed image on said support.

2. A method in accordance with claim 1 in which said acid is trichloroacetic acid in toluene.

3. The method according to claim 1 in which a layer of a second diffusable dye is applied in heat conductive contact with the same support after the first mentioned dye image has been produced;
   heating said support imagewise a second time to diffuse said second dye into said support in areas corresponding to the second heated image areas; and removing the second dye from the unheated areas, thereby producing a second dye image on said support.

4. The method according to claim 3 in which the second dye is of a different color from said first mentioned dye.

5. The method according to claim 1 wherein: said layer of diffusable dye is provided by coating said acid-treated support with a layer of said dye; and said dye removal is accomplished by washing said dye layer with a selective solvent for said dye in said unheated areas.

6. The method according to claim 1 wherein: said layer of diffusable dye is provided by contacting said acid-treated support with a dye-containing transfer layer sheet; and said dye removal is accomplished by separating said support and said transfer layer sheet.

7. A material for making thermographic copies, which comprises:
   a polyethylene terephthalate support having a surface containing trichloroacetic acid; and
   a layer of diffusible dye on said surface, whereby heating said material in imagewise fashion causes dye to diffuse into said support in the heated areas and removing the dye from the unheated areas produces a thermographic copy of the image.

8. A material in accordance with claim 7 in which said diffusible dye is a member selected from the group consisting of: Oil Red O (C.I. 26125); Methyl Violet 2B (C.I. 42535); Brilliant Oil Blue BMA (C.I. Solvent Blue 16); Rhodamine B (C.I. 45170); Azosol Fast Red BE (C.I. 12715); Azo Oil Blue-Black B (C.I. Solvent Black 12); Oil Yellow ENC (C.I. 11021); Aviation Oil Blue (C.I. Solvent Blue 58); Oil Brown Y (C.I. Solvent Orange 30 and 31); and Latyl Blue BN (C.I. Disperse Violet 27).

9. A material in accordance with claim 7 in which said layer comprises a binder.

10. A material in accordance with claim 9 in which the binder is plasticized polyvinyl chloride-acetate resin.

11. A material in accordance with claim 9 in which said binder is polyvinyl butyral.

12. A material in accordance with claim 9 in which said binder is cellulose acetate.

References Cited

UNITED STATES PATENTS

| | | | |
|---|---|---|---|
| 2,721,821 | 10/1955 | Hoover | 250—65.1 |
| 3,147,377 | 9/1964 | Newman | 250—65.1 |

RALPH G. NILSON, *Primary Examiner.*

A. L. BIRCH, *Assistant Examiner.*